(12) United States Patent
Ollinger et al.

(10) Patent No.: US 12,656,230 B2
(45) Date of Patent: Jun. 16, 2026

(54) GRAPHENE ENCAPSULATION OF BIOLOGICAL MOLECULES FOR SINGLE MOLECULE IMAGING

(71) Applicant: Bruker AXS SE, Karlsruhe (DE)

(72) Inventors: Christoph Ollinger, Karlsruhe (DE); Roger D. Durst, Pfinztal (DE)

( * ) Notice: Subject to any disclaimer, the term of this patent is extended or adjusted under 35 U.S.C. 154(b) by 1026 days.

(21) Appl. No.: 17/430,798

(22) PCT Filed: Feb. 12, 2020

(86) PCT No.: PCT/IB2020/051145
§ 371 (c)(1),
(2) Date: Aug. 13, 2021

(87) PCT Pub. No.: WO2020/165800
PCT Pub. Date: Aug. 20, 2020

(65) Prior Publication Data
US 2022/0163431 A1 May 26, 2022

Related U.S. Application Data

(60) Provisional application No. 62/804,856, filed on Feb. 13, 2019.

(51) Int. Cl.
*G01N 1/36* (2006.01)

(52) U.S. Cl.
CPC ...................................... *G01N 1/36* (2013.01)

(58) Field of Classification Search
CPC ............................ G01N 1/36; G01N 2001/368
See application file for complete search history.

(56) References Cited

U.S. PATENT DOCUMENTS

2011/0076778 A1* 3/2011 Peterson .................. C07K 1/18
530/402
2012/0228495 A1* 9/2012 Kalachev ............. G01N 21/658
427/8
(Continued)

FOREIGN PATENT DOCUMENTS

CN 106769287 A * 5/2017 .......... G01N 1/2853
JP 2014-229401 12/2014

OTHER PUBLICATIONS

Chen, et al., "3D Motion of DNA-Au Nanoconjugates in Graphene Liquid Cell Electron Microscopy", 2013, Nano Lett., 13, p. 4556-4561 and SI p. 1-9 (Year: 2013).*
(Continued)

*Primary Examiner* — Gordon Baldwin
*Assistant Examiner* — Christina D Mcclure
(74) *Attorney, Agent, or Firm* — DECODE Legal Inc.

(57) ABSTRACT

In a method of preparing a single molecule sample of a biological material for use in an imaging experiment, the single molecule sample is deposited on a graphene substrate using a method such as nanopipetting. Excess bulk fluid surrounding the molecule is then removed, for example, by mechanical blotting or controlled evaporation. An enclosing layer of graphene is then deposited and sealed to the graphene substrate so as to encapsulate the molecule. This sealing may include floating the enclosing layer in a water bath and moving it into contact with the graphene substrate. The molecule of interest may be deposited directly on the substrate, or a linker molecule may be first deposited to provide an attachment between the substrate and the molecule of interest.

11 Claims, 4 Drawing Sheets

(56)                    References Cited

U.S. PATENT DOCUMENTS

2016/0329187  A1*  11/2016  Kidwell ................ C23C 16/01
2018/0353613  A1*  12/2018  Cohen ................. A61K 31/704
2019/0003999  A1*   1/2019  Thompson ............. H01J 37/20

OTHER PUBLICATIONS

Ivanov, et al., "On-Demand Delivery of Single DNA Molecules Using Nanopipettes", 2015, ACS Nano, 9, p. 3587-3595 (Year: 2015).*
Gyobu, et al., "Improved Specimen Preparation for Cryo-Electron Microscopy Using a Symmetric Carbon Sandwich Technique", 2004, Journal of Structural Biology, 146, p. 325-333 (Year: 2004).*
Wang, et al., "High-Resolution Electron Microscopy and Spectroscopy of Ferritin n Biocompatible Graphene Liquid Cells and Graphene Sandwiches", 2014, Adv. Mater., 26, p. 3410-3414 and SI p. 1-18 (Year: 2014).*
CN-106769287-A, machine translation, originally published 2017, p. 1-42 (Year: 2017).*

M. Wojcik et al., "Graphene-enabled electron microscopy and correlated super-resolution microscopy of wet cells", Nature Communications 6 (2015).
H. Cho et al., "The Use of Graphene and Its Derivatives for Liquid-Phase Transmission Electron Microscopy of Radiation-Sensitive Specimens", Nano Lett., 2017, 17 (1), pp. 414-420.
E. Fill et al., "Single-molecule electron diffraction imaging with charge replacement", New Journal of Physics 10 (2008).
R. Zan et al., "In Control of Radiation Damage in MoS2 by Graphene Encapsulation", ACS Nano, 2013, 7 (11), pp. 10167-10174.
G. Rinke, et al., "Soft-landing electrospray ion beam deposition of sensitive oligoynes on surfaces in vacuum", International Journal of Mass Spectrometry, vol. 377, Feb. 1, 2015, pp. 228-234.
H. Arjmandi-Tash, et al., "Single molecule detection with graphene and other two-dimensional materials: nanopores and beyond", Chemical Society Reviews, vol. 45, No. 3, 2016.
Y. Zhao, et al., "Enhanced SERS Stability of R6G Molecules with Monolayer Graphene", Journal of Physical Chemistry C, vol. 118, No. 22, Jun. 2014.

* cited by examiner

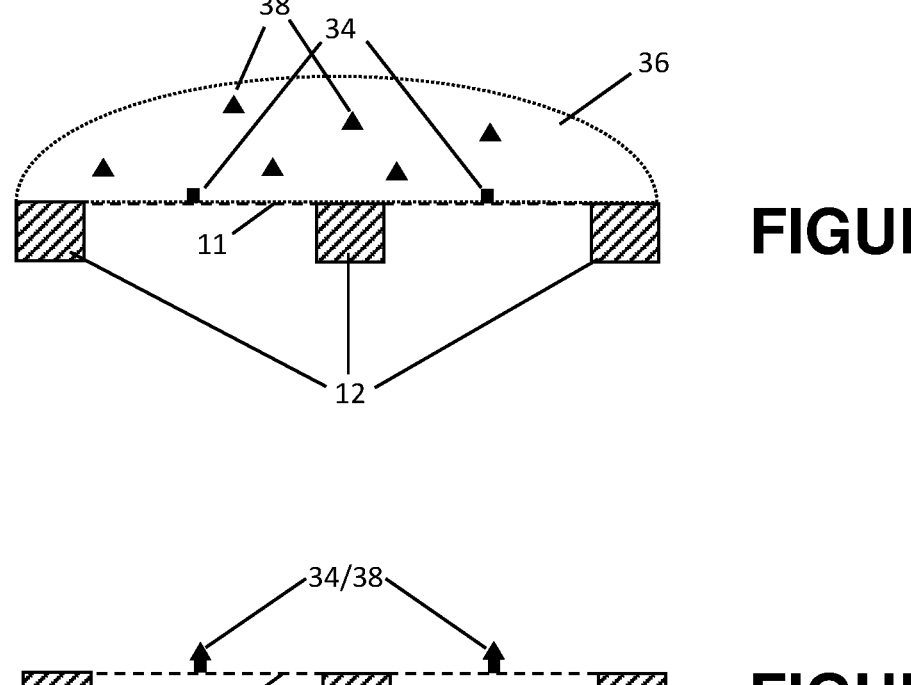
FIGURE 3D
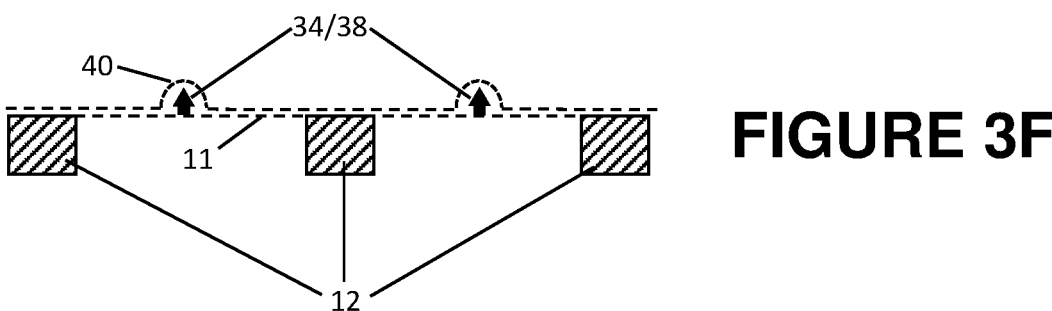
FIGURE 3E
FIGURE 3F

GRAPHENE ENCAPSULATION OF BIOLOGICAL MOLECULES FOR SINGLE MOLECULE IMAGING

BACKGROUND OF THE INVENTION

It is known that graphene is an attractive substrate for electron imaging in that it is substantially transparent to electrons, mechanically robust and can also protect samples from dehydration in vacuum. For example, in *Graphene-enabled electron microscopy and correlated super-resolution microscopy of wet cells*, M. Wojcik et al, Nature Communications 6 (2015), the authors describe the use of graphene to protect cell and cell organelles during electron microscopy.

Besides protecting biological samples from vacuum. It is known that graphene can protect biological samples from free-radical damage. That is, under exposure to electrons, water molecules suffer hydrolysis, producing free radicals that can damage biological samples. Graphene is known to scavenge such free radicals, therefore protecting biological samples, as discussed in, for example, *The Use of Graphene and Its Derivatives for Liquid-Phase Transmission Electron Microscopy of Radiation-Sensitive Specimens*, H. Cho et al., Nano Lett., 2017, 17 (1), pp 414-420.

It has been proposed that single biological molecules can be mounted onto a freestanding sheet of graphene in order to protect them from radiation damage to ionization. See, e.g., *Single-molecule electron diffraction imaging with charge replacement*, E. Fill et al., New Journal of Physics 10 (2008). In *Control of Radiation Damage in $MoS_2$ by Graphene Encapsulation*, R. Zan et al., ACS Nano, 2013, 7 (11), pp 10167-10174 describes that a monolayer of $MoS_2$ deposited between two graphene suffers reduced radiation damage compared to the same layer deposited on a single layer of graphene.

SUMMARY OF THE INVENTION

Biological molecules that are intrinsically disordered or take more than a single conformation are not amenable to conventional structural solution technique such as Cryo-EM or crystallography. In contrast, coherent diffraction imaging (CDI) with X-rays or electrons is one of the techniques proposed for single molecule imaging. Electrons in particular have a potential advantage for CDI due to their much higher ratio of elastic scattering to inelastic scattering. However, electron CDI also imposes practical challenges. In particular, biological molecules are particularly fragile and must therefore be protected during the experiment.

In an electron CDI experiment, a sample molecule, such as a protein, must be mounted in a vacuum since, unlike X-rays, electrons will not propagate in a background gas. However, it is known that dehydration can change the conformation of some proteins. Therefore, the present invention is adapted to protect the sample from dehydration. In addition, the invention protects the sample from radiation damage due to the incident electron beam, which can occur via several mechanisms including:

i) hydrolysis of the water surrounding the molecule (which, in turn, leads to free radical damage);

ii) ionization of the molecule; and iii) displacement of an atom in the molecule.

In addition to protecting the sample against vacuum and radiation, it is important that the sample molecules be kept as closely as possible in their native state. The invention therefore includes depositing single molecules onto a graphene substrate such that the molecule retains its natural hydration shell (and, thus, its natural conformation) while the bulk fluid surrounding the molecule is removed. The sample is then covered by a second sheet of graphene that is in electrical contact with the sample. The sample is thus surrounded on all sides by a highly conductive graphene layer. Such a configuration gives the maximum protection against radiation damage while also protecting the sample against vacuum dehydration.

In the invention, a single biological molecule is deposited onto a layer of graphene in such a manner that its native hydration shell is intact but any extraneous bulk fluid is removed. Retaining the hydration shell ensures that the protein is as close as possible to its native environment and that it, therefore, retains its natural conformation. Removing the bulk fluid reduces extraneous radiation damage due to water hydrolysis. It also improves the electrical contact between the sample molecule and the graphene layers in order to decrease the charge replacement time, thus further improving radiation protection. Finally, removing the bulk fluid also reduces extraneous electron scattering which can reduce the signal-to-noise ratio of the CDI experiment.

The second layer of graphene is applied so as to encapsulate the sample. This serves to enhance the electrical contact with the molecule, thus improving radiation protection, while also protecting the molecule against vacuum dehydration. The improved electrical contact is particularly important for physically larger molecules that may not have sufficient electrical contact with a single sheet of graphene.

In one embodiment, the molecule of interest is deposited on the graphene substrate, such as by using a nanopipette that dispenses the molecule in a droplet of surrounding solution. The graphene substrate may be supported by a conductive grid, and the molecule deposited between the structural elements of the grid so as to not impede electron radiation directed at the molecule. After deposition, excess fluid surrounding the molecule is removed, such as by controlled evaporation or blotting, leaving only the molecule in its hydration shell. A covering layer of graphene is then added to encapsulate the molecule in a graphene enclosure, thereby retaining its hydrated state.

In an alternative embodiment, a linker molecule may be used to bond to the molecule of interest and to the graphene substrate. In this embodiment, the linker molecule is first deposited on the graphene substrate, using a method such as nanopipetting of a droplet of solution containing the linker. The linker molecule is located so that it attaches to an unobstructed region of the substrate, such as in between adjacent structural elements of a conductive support grid. The excess fluid surrounding the linker molecule is then removed, and a solution containing the molecule of interest is spotted over the linker location. After waiting an appropriate amount of time for the molecule of interest to attach to the linker, the excess solution is washed away, leaving the linker molecule and attached molecule of interest. A second graphene sheet is then applied to encapsulate the molecules.

The invention may also make use of a conductive carrier on which the conductive grid is mounted, such that the grid and the carrier are in electrical contact with the graphene substrate. The enclosing layer of graphene may also be mounted on a conductive carrier, and the two conductive carriers brought together when applying the encapsulating layer to the substrate layer. The conductive carrier for the encapsulating graphene layer may have a support grid like that of the substrate carrier, and the two carriers arranged such that, during encapsulation, the support grids are aligned with each other. The conductive carrier for the encapsulating layer may alternatively be opaque to radiation used in the imaging experiment, except for a single radiation opening, which is aligned with the location of a molecule of interest.

Prior art use of a single layer of graphene to reduce radiation damage via ionization is limited in that sufficient protection is only provided to one side of the molecule. As the charge replacement rate is limited by the conduction of charge through the molecule, portions of the molecule that are geometrically far from the underlying graphene substrate have less protection against damage. There is also no protection for a biological molecule against vacuum dehydration.

The use of graphene encapsulation to reduce radiation damage in a liquid cell, that is, in a sample which is entrained in a small amount of water or fluid, is limited by the fact that the dominant radiation damage mechanism is free radicals produced in the bulk fluid via radio-hydrolysis. Since there is no removal of the bulk fluid, such damage occurs, and the system suffers from an elevated degree of electron scattering due to the bulk fluid. These factors make this configuration unsuitable for single molecule imaging, due to both the free radical damage and a level of scattering too high to allow a determination of molecular structure with high resolution.

Prior art encapsulation of $MoS_2$ between two sheets of graphene in order to reduce radiation damage has been described for a two-dimensional crystal sample, but not for a single biological molecule. There is thus no consideration of radiation damage from free radical damage via radio-hydrolysis electron scattering due to the presence of bulk fluid. There is likewise no protection against vacuum dehydration, as would be necessary for single molecule imaging of biological molecules.

BRIEF DESCRIPTION OF THE DRAWINGS

FIG. 3D is a schematic view of the application of a solution containing molecules of interest to graphene substrate on which the linker molecules of FIG. 3C are located.

FIG. 3E is a schematic view of attached linker molecules and molecules of interest on the graphene substrate of FIG. 3D after washing away of excess solution.

FIG. 3F is a schematic view of the attached linker molecules and molecules of interest shown in FIG. 3E with an encapsulating graphene layer applied thereto.

DETAILED DESCRIPTION

In an exemplary embodiment of the invention, a single molecule is deposited onto a graphene substrate using one of several techniques (e.g., electro-spray ion beam deposition (ES-IBD), or nanopipetting or nanospotting using atomic force microscopy (AFM)). In ES-IBD (as discussed, for example, in *Soft-landing electrospray ion beam deposition of sensitive oligoynes on surfaces in vacuum*, G. Rinke, et al., International Journal of Mass Spectrometry, Volume 377, 1 Feb. 2015, pages 228-234), a beam of pure protein ions is deposited onto the substrate in vacuum. ES-IBD thus tends to dehydrate the molecules which, as noted above, may cause the target protein in some cases to change its conformation.

The preferred approach used in the invention is nanopipetting. In this case, a hollow AFM tip is used to deposit very small volumes of fluid (e.g., in the femtoliter range) containing protein onto the graphene. This has the advantage that the protein always remains in a hydrated state. Also, unlike in ES-IBD, the protein can be placed precisely into the center of a grid opening location, which is optimal for subsequent imaging.

Figures 2A, 2B, 2C, 2D:
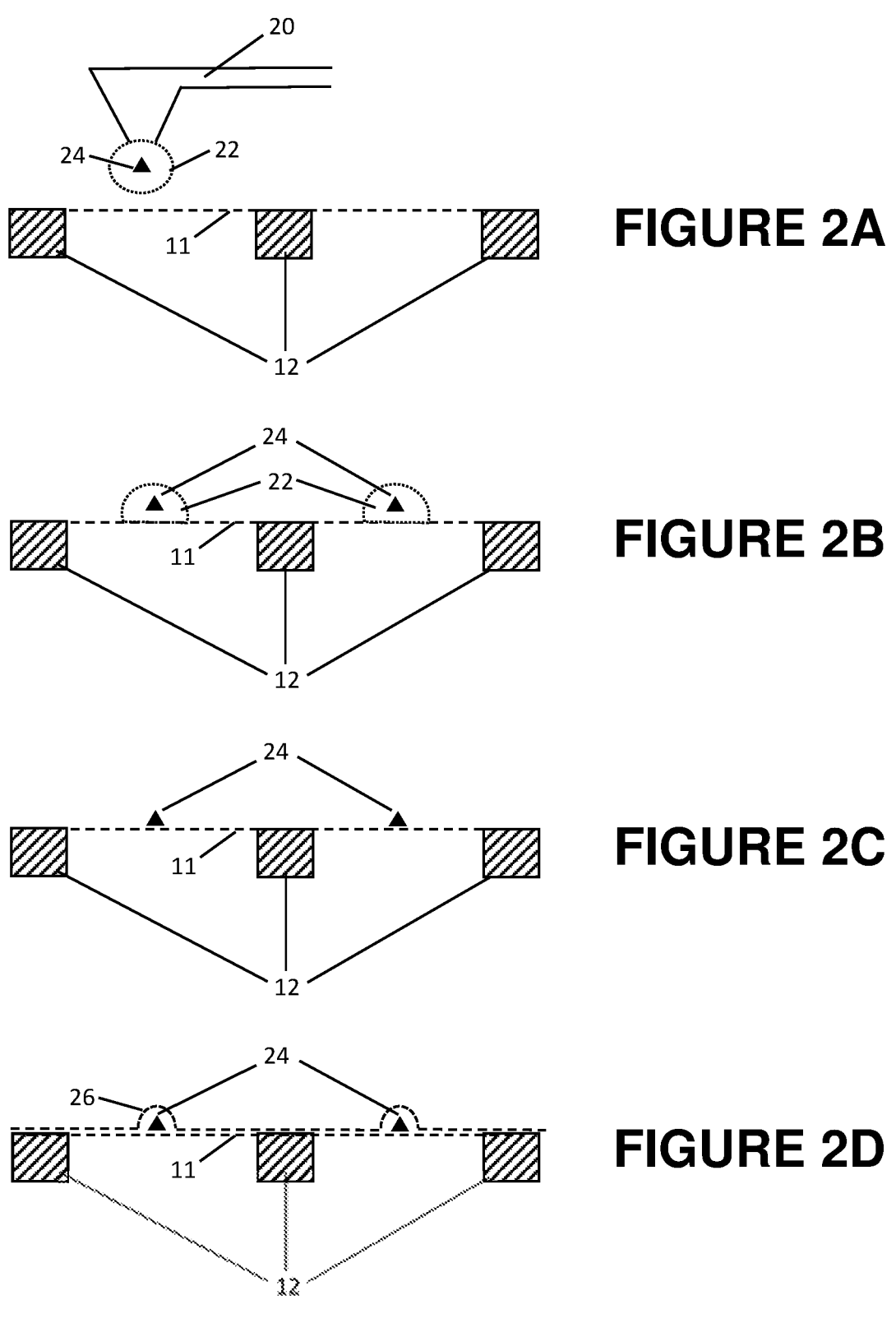
FIG. 2A is a schematic view of the pipetting of a solution containing a molecule of interest onto a graphene substrate in accordance with a first embodiment of the invention.
FIG. 2B is a schematic view of pipetted droplets containing molecules of interest on the graphene substrate of FIG. 2A.
FIG. 2C is a schematic view of the molecules shown in FIG. 2B after removal of the excess fluid surrounding them.
FIG. 2D is a schematic view of the molecules of FIG. 2C with an encapsulating graphene layer applied thereto.

An example of a nanopipetting and encapsulation method according to the present invention is shown schematically in FIGS. 2A-2D. A first graphene substrate 11 is located on a support grid 12, for which only several of the structural members are shown in cross-section. As shown in FIG. 2A, pipette 20 is used to dispense a droplet 22 of solution containing a protein molecule 24 onto a region of the graphene substrate between adjacent structural members of the grid so as to avoid any impeding of the electron radiation by the grid 12. In the exemplary embodiment of the invention, the pipette 20 is a hollow atomic force microscopy (AFM) tip with a sub-micron sized outlet port. Droplets 22 may be deposited at similar locations across the graphene substrate 11, as shown in FIG. 2B, to allow for multiple experiments to be performed with the same substrate arrangement.

After deposition of the samples, the excess fluid is removed, such as by evaporation, leaving only the protein molecule 24 in its hydration shell, as shown in FIG. 2C. A covering layer 26 of graphene is then added to encapsulate the molecules 24. This seals the molecules 24, with their respective hydration layers, in a graphene enclosure, thereby retaining their hydrated state, and providing additional protections to the molecules as described herein. Another way to deposit the protein is to first deposit a chemical linker on the graphene surface. The linker is a small molecule which will bind to the graphene surface and also to the protein of interest. This linker may be deposited onto the graphene substrate using the nanopipetting approach described above. After the linker is deposited, the protein solution can be spotted over the linker location, and protein will bond to the linker. The surface can then be rinsed in pure water to remove any excess proteins or solvents. An example of this alternative embodiment is shown in FIGS. 3A-3F.

Figures 3A, 3B, 3C:
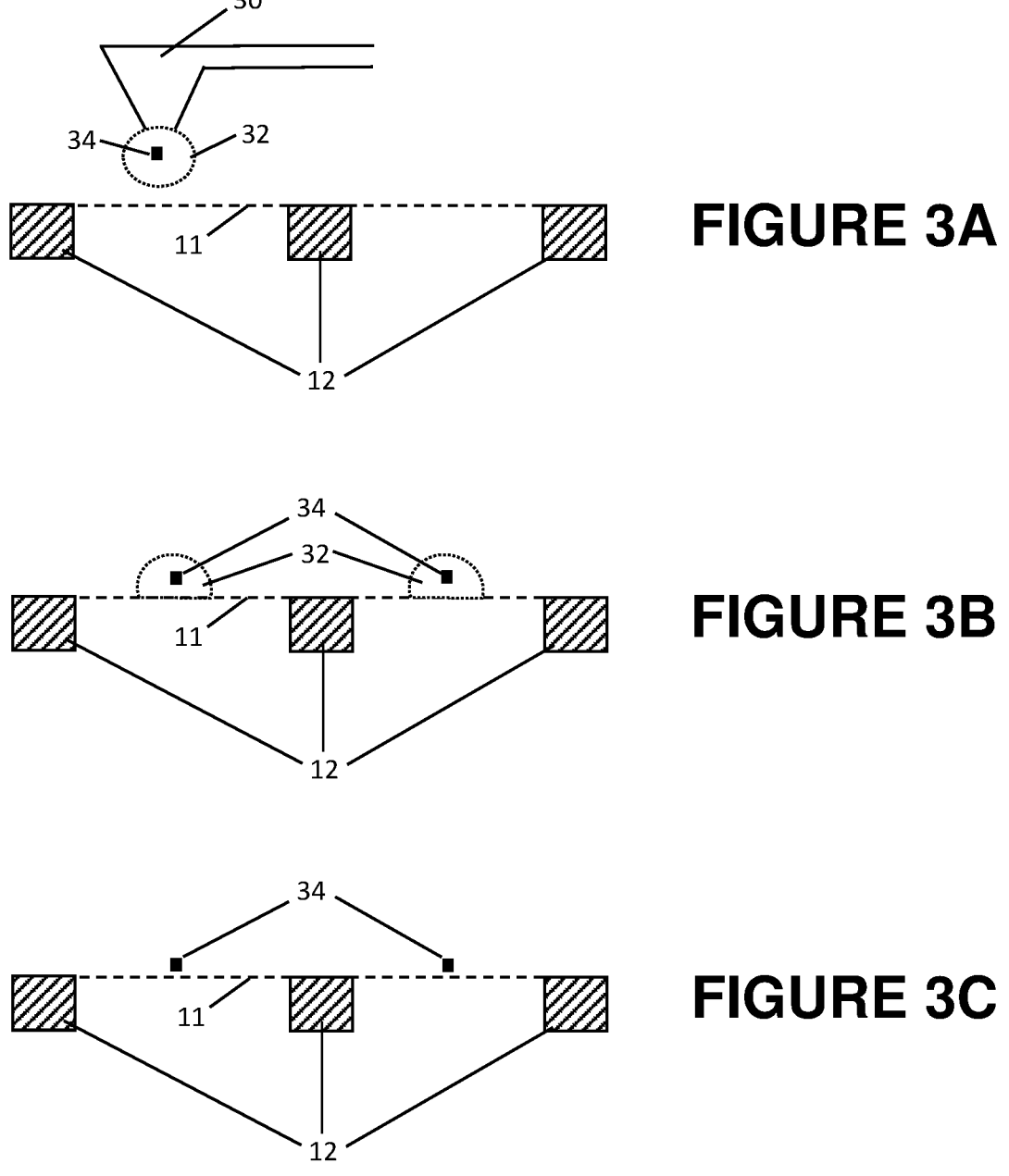
FIG. 3A is a schematic view of the pipetting of a solution containing a linker molecule onto a graphene substrate in accordance with a second embodiment of the invention.
FIG. 3B is a schematic view of pipetted droplets containing linker molecules on the graphene substrate of FIG. 3A.
FIG. 3C is a schematic view of the linker molecules shown in FIG. 3B after removal of the excess fluid surrounding them.

In FIG. 3A, pipette 30 which, like the pipette in FIG. 2A, may use a hollow atomic force microscopy (AFM) tip with a sub-micron sized outlet port, dispenses a droplet 32 containing a linker molecule 34 that attaches selectively to the protein molecule of interest. The droplets 32 are deposited on the graphene substrate 11 at locations between the structural elements of the underlying support grid 12. The bulk fluid surrounding the linker molecules 34 is then removed by evaporation or some other method described herein, leaving the linker molecules with their respective hydration layers bound in place on the graphene substrate 11, as shown in FIG. 3C.

As shown in FIG. 3D, a protein solution 36 containing protein molecules 38 is spread on the graphene substrate 11, covering the linker molecules 34. An appropriate amount of time is then allowed to pass for protein molecules 38 in the solution 36 to attach to the linker molecules 34, and the excess solution is then washed away, leaving the linker molecule/protein molecule combinations 34/38 on the surface of the graphene substrate 11, as shown in FIG. 3E. A second layer of graphene is then applied as encapsulation layer 40, as shown in FIG. 3F. As in the step shown in FIG. 2D of the embodiment of FIGS. 2A-2D, this application of a second graphene sheet seals the linker molecules/protein molecules 34/38, with their respective hydration layers, in a graphene enclosure, thereby retaining their hydrated states, and being protected as described elsewhere herein.

The nanoscale spotting approaches outlined above do not result in dehydration of the protein. However, the proteins are deposited in excess fluid, which must be removed while retaining the hydration shell. One way to accomplish this is via mechanical blotting in which a highly absorbent surface is used to absorb the excess fluid. In this case, in order not to disturb the protein or cause mechanical damage to the graphene, the blotter should preferably be brought into contact with the liquid but not into contact with the graphene itself. That is, there should remain a small mechanical gap between the blotter and the graphene layer.

Another approach to removing the excess fluid is via controlled evaporation in which the protein in aqueous solution is allowed to evaporate in an environment with fixed humidity and temperature. Since the hydration layer is chemically bonded to the molecule, it evaporates more slowly than bulk fluid. This results in a molecule that has no excess, bulk liquid layer. The removal of the bulk fluid layer eliminates radiation damage due to free radicals in the fluid, and reduces scatter of the electron beam which would otherwise decrease the effective resolution. It also maximizes the electrical contact with the graphene layers, thus increasing the ionization neutralization rate.

After deposition of the sample on the graphene substrate, a second layer of graphene is deposited over it. One way to accomplish this encapsulation is by lifting a second, covering graphene layer off of a water surface. That is, the second layer of graphene is floated on the surface of a water bath. The first graphene surface which contains the mounted protein sample is then touched to the floating graphene which then adheres.

Figure 1A:
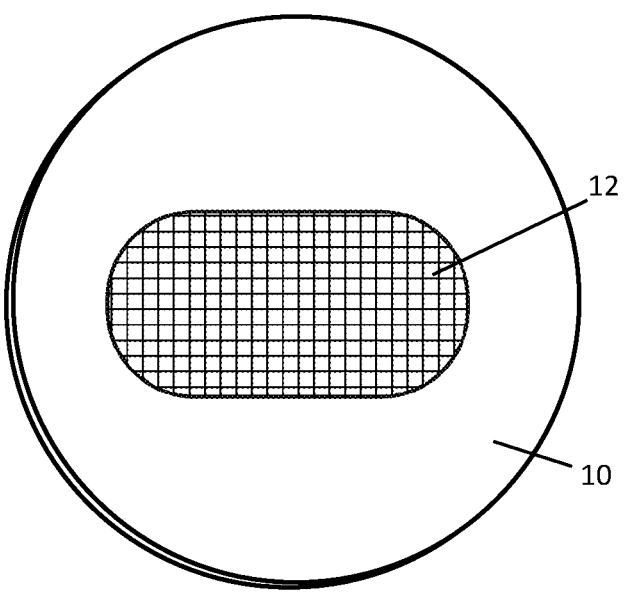
FIG. 1A is a schematic view of the top half of a clamshell arrangement for graphene encapsulation according to the present invention.
Figure 1B:
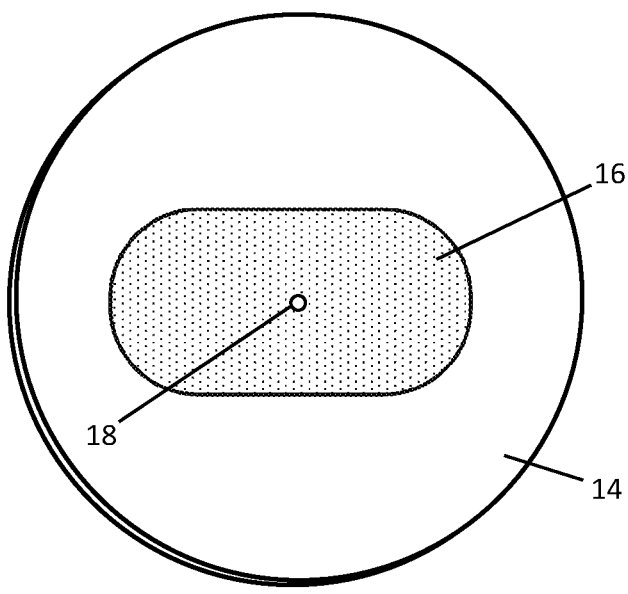
FIG. 1B is a schematic view of the bottom half of the aforementioned clamshell arrangement for graphene encapsulation that is bonded to the top half shown in FIG. 1A.

Another approach is to use a clamshell arrangement. That is, in the first instance, the proteins are deposited onto a graphene layer mounted on a carrier frame, as shown in FIG. 1A. In FIG. 1A, an electrically-conductive carrier 10 has a region with a support grid 12 over which a graphene layer is deposited. In the figure, the carrier is shown as circular, but those skilled in the art will understand that other shapes may also be used. On another electrically-conductive carrier 14, a second graphene layer is mounted onto a matching frame 16, as shown in FIG. 1B. In FIG. 1B, the graphene layer is deposited over an open area in the electrically-conductive carrier 14. The two frames are then bonded together using pressure bonding or some similar technique.

In the present embodiment, the oval regions of FIGS. 1A and 1B represent openings in the conductive carrier material

10 and 14, respectively. The support grid 12 in FIG. 1A covers the entire open region of the carrier material 10, allowing for radiation to pass through any of the grid openings. In this version of the invention, the matching frame 16 has only one opening 18 at its center. This would allow only one location in the grid 12 to be imaged, since radiation would be blocked from passing through the other parts of the open region. Alternatively, a grid like grid 12 of the carrier 10 could be used on the carrier 14, creating a matching surface in the two halves of the clamshell arrangement, and thereby allowing radiation imaging at multiple locations across the area of the open regions. The grid material for either or both of the two sides is a conductive material that is separate from the conductive carrier, although in an alternative embodiment, the grids may be of the same material and, possibly, integral with the carrier material. Regardless of the form of these two structures, the graphene layers on each of the carriers would nonetheless seal the sample molecule in the interior of the structure, providing the desired protection against radiation damage and dehydration.

Assembly of the two halves of the structure shown in FIGS. 1A and 1B is done by bonding together the opposing surfaces of the carriers 10 and 14. In an exemplary embodiment, the surfaces of the carriers are coated with a pressure-activated adhesive, and pressed together after the sample deposition, although those skilled in the art will recognize that other methods exist as well. The encapsulation methods described herein result in a sample that is in intimate electrical contact with graphene across its entire surface and, thus, has the maximum possible charge replacement rate. This, in turn, provides superior protection against ionization damage. In addition, this second layer of graphene also protects the sample from dehydration in vacuum during electron irradiation during CDI.

The present invention recognizes that the imaging of a single biological molecule with coherent electrons at a sufficient resolution requires a dose of electrons that is much higher than could typically be withstood without destruction of the molecule. Thus, the embodiments described herein significantly minimize the sources of radiation damage. Encapsulation of the sample molecule in graphene minimizes ionization damage as the conductive graphene provides a source of fast charge replacement for the entire molecule, which is surrounded by graphene on all sides. The graphene also scavenges free radicals created by hydrolysis in the surrounding fluid. The primary electron energy is also maintained at a level below that which might cause knock on damage, in which an atom of the molecule is expelled by electron impact. In the present embodiment, that maximum electron energy level is about 20 keV for organic bonds, although it will be recognized by those skilled in the art that other levels may be more appropriate for different conditions. In addition to the radiation damage protections discussed above, the removal of the bulk fluid and encapsulation of the molecule with just its hydration shell minimizes the generation of free radicals while keeping the molecule sufficiently hydrated that it maintains its conformation.

The invention claimed is:

1. A method for preparing a single molecule sample of a biological material of interest for use in a sample imaging experiment, the method comprising:
   depositing said single biological molecule sample on a graphene substrate;
   removing excess bulk fluid surrounding the molecule so as to leave only the molecule in its hydration shell; and depositing an enclosing layer of graphene and sealing said enclosing layer to the graphene substrate so as to encapsulate the sample molecule, wherein the graphene substrate is mounted on, and in electrical contact with, a conductive grid, and is in electrical contact with the sample molecule.

2. A method according to claim 1 wherein the single molecule sample is deposited by nanopipetting.

3. A method according to claim 1 wherein, prior to the deposition of the sample, a chemical linker is deposited on the graphene substrate that binds to the graphene substrate and to the molecule.

4. A method according claim 1 wherein removing excess bulk fluid surrounding the molecule comprises mechanical blotting.

5. A method according to claim 1 wherein removing excess bulk fluid surrounding the molecule comprises controlled evaporation.

6. A method according to claim 1 wherein the graphene substrate is in electrical contact with a conductive carrier and with the sample molecule.

7. A method according to claim 6 wherein the enclosing layer of graphene is in electrical contact with a conductive carrier and with the sample molecule.

8. A method according to claim 1 wherein the enclosing layer of graphene is mounted on a conductive carrier having a single radiation opening.

9. A method according to claim 1 wherein the enclosing layer of graphene is mounted on a conductive carrier having a conductive support grid.

10. A method according to claim 1 wherein depositing an enclosing layer of graphene comprises floating the enclosing layer on the surface of a water bath and moving into contact with the graphene substrate.

11. A method according to claim 1 wherein the graphene substrate and the enclosing layer of graphene are each mounted on a conductive carrier, and wherein the carriers are bonded to each other to effectuate the encapsulation of the sample molecule.

* * * * *